US005182846A

United States Patent [19]

Tomita et al.

[11] Patent Number: 5,182,846

[45] Date of Patent: Feb. 2, 1993

[54] PROCESS FOR PRODUCING A DIAPHRAGM FOR ACOUSTIC APPLIANCES

[75] Inventors: Nobuaki Tomita; Kunio Suzuki, both of Shizuoka, Japan

[73] Assignee: Yamaha Corporation, Japan

[21] Appl. No.: 770,224

[22] Filed: Oct. 2, 1991

[30] Foreign Application Priority Data

Oct. 4, 1990 [JP] Japan ................................ 2-267341

[51] Int. Cl.[5] .............................................. B23P 17/00

[52] U.S. Cl. ................................. 29/527.2; 29/527.7; 29/594; 148/665; 164/46

[58] Field of Search .................... 29/527.2, 594, 527.7; 164/46, 76.1, 476, 477; 148/11.5

[56] References Cited

U.S. PATENT DOCUMENTS 3,895,671 7/1975 Suzuki ................................ 164/46

4,847,981 7/1989 Suzuki et al. ......................... 29/594

5,017,245 5/1991 Suzuki et al. .................. 29/527.2 X

FOREIGN PATENT DOCUMENTS 59-21408 2/1984 Japan .

*Primary Examiner*—Carl J. Arbes

*Attorney, Agent, or Firm*—Ostrolenk, Faber, Gerb & Soffen

[57] ABSTRACT

In production of a beryllium type diaphragm used for acoustic appliances such as speakers and microphones, formation of a crude beryllium plate by means of vacuum deposition is followed by hot cross rolling and hot pressing. Vacuum deposition well reduces production of undesirable impurities such as BeO and hot rolling increases density of the beryllium crystal structure obtained by the preceding vacuum deposition, both for betterment in acoustic and mechanical characteristics of the product such as sound pressure and mechanical strength.

11 Claims, 5 Drawing Sheets

PROCESS FOR PRODUCING A DIAPHRAGM FOR ACOUSTIC APPLIANCES

BACKGROUND OF THE INVENTION

The present invention relates to method for producing a diaphragm for acoustic appliances, and more particularly relates to improvements in acoustic and mechanical characteristics of a diaphragm made of beryllium having high degree of treble range reproduction.

Various methods have been developed in production of a diaphragm made of beryllium. According to "New materials, new metals and modern production processes" by Ryohei Tanaka (page 612), powder metallurgy processes and vacuum deposition processes have been typically employed in production of diaphragms made of beryllium. A different process was also proposed by the inventors of the present invention in Japanese Patent Application Sho. 63-274295 filed in 1988.

In production of a beryllium diaphragm by means of powder metallurgy process, beryllium flakes are melted in a vacuum environment to obtain a beryllium ingot which is then screened after chipping and crushing to obtain beryllium powder. Next, the powder is subjected to a hot vacuum pressing process and a hot pressed block so prepared is subjected to a hot cross rolling process to obtain a rolled plate of 20 to 100 μm thickness. The rolled plate is finally subjected to a hot pressing process to obtain a diaphragm of a desired configuration.

Production via powder metallurgy is inevitably accompanied with increased inclusion of impurities, in particular BeO, in the beryllium plate. Increased presence of such impurities significantly lowers ductility of the beryllium plate which is thus made quite unsuited for the following pressing. In addition, increased inclusion of such impurities lower the sound speeds of sounds generated by a resultant diaphragm, thereby impairing the acoustic characteristics of the product. This process is also entails high cost and much labor due to its cumbersome process steps.

In the case of production via a vacuum deposition process, a beryllium ingot is prepared first to form beryllium flakes as in the case of the metallurgy process and a copper or titanium foil is used for the substrate. A beryllium layer is formed on the surface of the substrate by means of a vacuum deposition process and a beryllium plate is obtained by etching the substrate. In order to made the internal structure of this beryllium plate denser, heat treatment is applied to the beryllium plate.

Despite reduced inclusion of impurities, the product by this vacuum deposition process cannot exhibit appreciable mechanical endurance such as mechanical strength in generation of sounds of large amplitudes in the low frequency range. In addition, the product cannot provide sounds generated with high sound pressure.

The process of Japanese Patent Application Sho. 63-274295 is based on use of vacuum deposition process. More specifically, a beryllium plate is first prepared by means of a vacuum deposition process. The beryllium plate so obtained is next subjected to high temperature treatment such as a hot pressing process or a hot hydraulic pressing process.

In this case, use of the high temperature treatment under pressure raises density of the beryllium crystal without any substantial change in crystal structure. High density assures high sound pressure of sounds generated by the resultant diaphragm. The beryllium crystals formed by vacuum deposition stand almost perpendicular to the surface of the substrate in a column form which is maintained even after the high temperature treatment under pressure. Such a crystal structure does not sufficiently assure generation of sounds with high sound pressure.

SUMMARY OF THE INVENTION

It is the object of the present invention to produce a beryllium type diaphragm having high acoustic characteristics with appreciable mechanical strength.

In the process of the present invention, a beryllium plate prepared by vacuum deposition is subjected to hot cross rolling followed by hot pressing.

DESCRIPTION OF THE PREFERRED EMBODIMENTS

Figure 1:
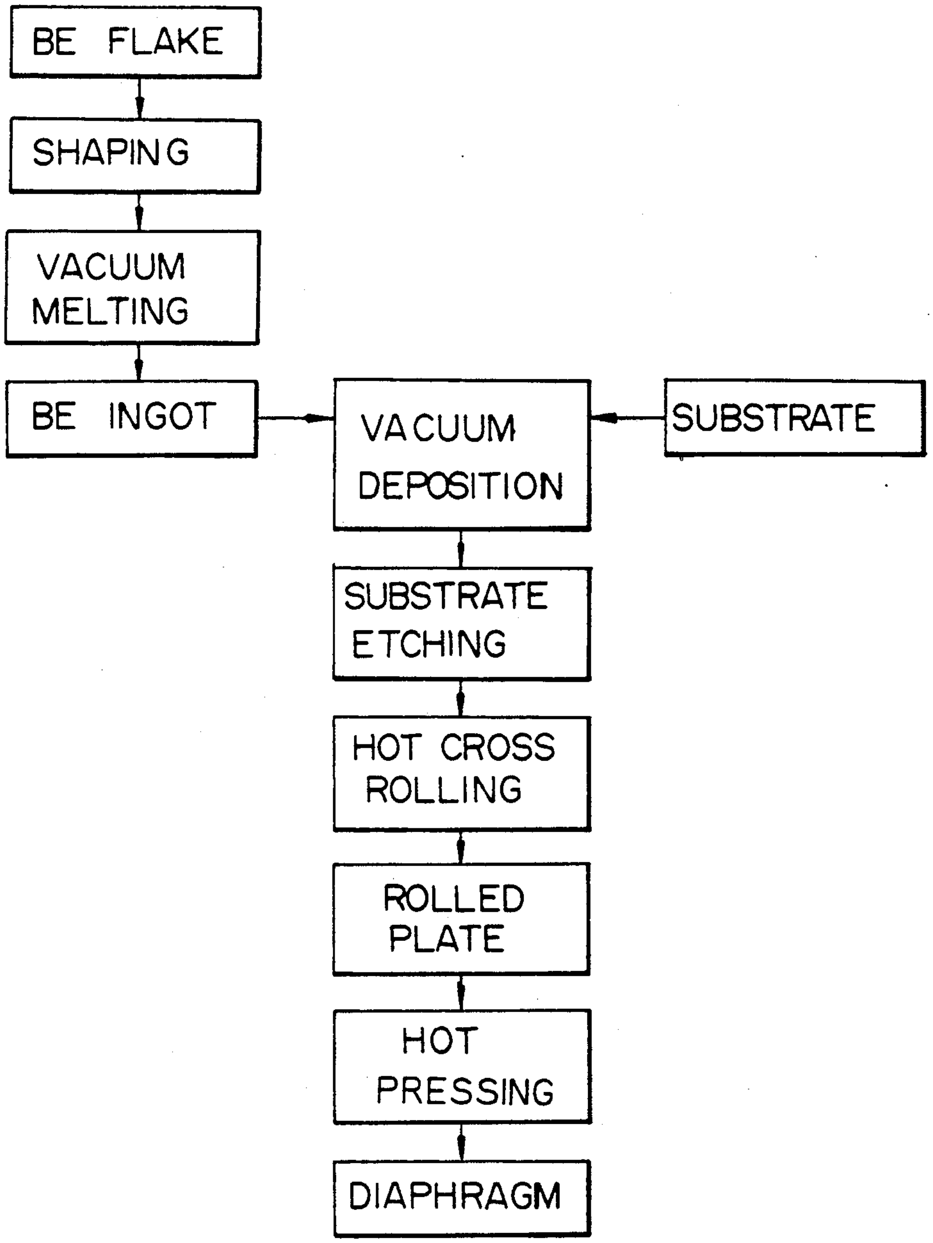
FIG. 1 is a flow chart of the process in accordance with the present invention.

One embodiment of the process in accordance with the present invention is graphically shown in FIG. 1, in which, as in the conventional process, Be flakes are first subjected to shaping and vacuum melting to obtain a beryllium ingot. Concurrently, a substrate for deposition of beryllium is prepared. For example, molybdenum is deposited on a copper disc of 70 mm diameter over a thickness of several thousands angstroms for promotion of beryllium crystal growth. A beryllium layer is formed on the substrate by means of a vacuum deposition process.

Figure 2:
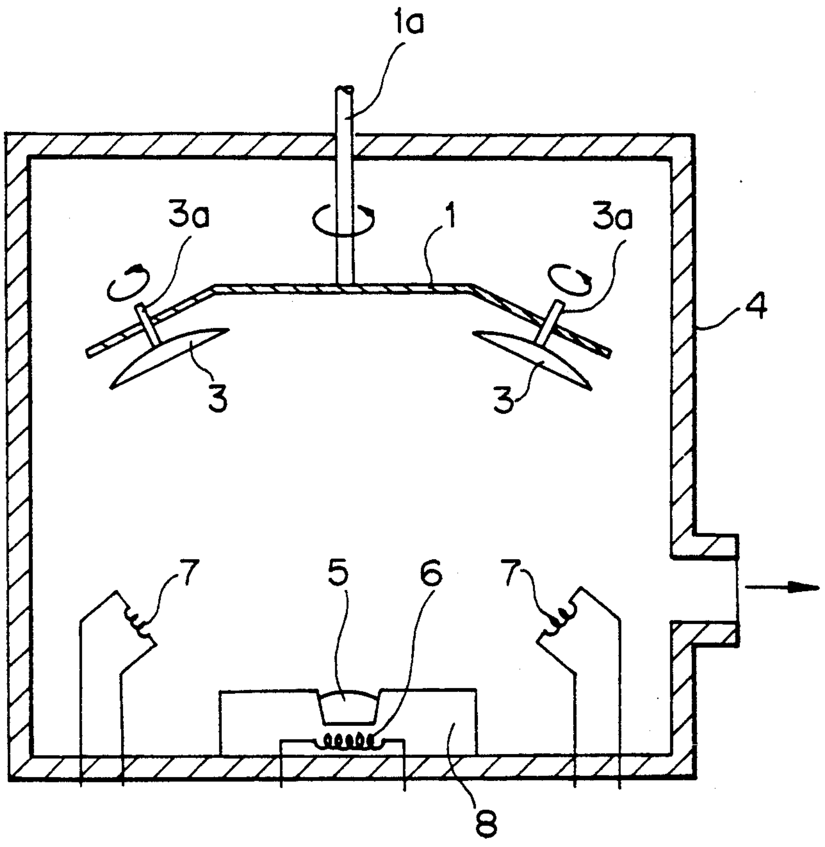
FIG. 2 is a side view, partly in section, of one embodiment of a vacuum deposition unit usable for the process of the present invention.

The vacuum deposition process is preferably carried out in a unit such as shown in FIG. 2, in which a rotary shaft 1*a* driven by a drive source not shown is internally mounted to the ceiling of a deposition chamber 4 in order to carry a disc 1. The deposition chamber 4 is provided with a known vacuum system which is not shown in the drawing. A plurality of holders 3 are mounted to the lower face of the disc 1 via respective rotary shafts 3*a*. The holders 3 are adapted for holding a substrate. Thus, during the deposition process, each holder 3 with its substrate travels around the common rotary shaft 1*a* while rotating about its own rotary shaft 3*a*.

A support table 8 is centrally placed on the floor of the deposition chamber 4 for reception of a beryllium source taken from the beryllium ingot prepared as described above. An electric heater 6 is arranged in the support table 8 for heating of the beryllium source 5 whereas one or more like electric heaters 7 are arranged around the support table 8 facing upwards for heating of the substrates on the holders 3. The electric heaters 6 and 7 are connected to a proper power source not shown.

With this arrangement, a beryllium source 5 taken from the beryllium ingot is placed in a recess formed atop the support table 8 and substrates are mounted to the overhead holders 3. The vacuum system is actuated to create a highly vacuum state by evacuating air within the deposition chamber 4. The rotary shafts 1*a* and 3*a* are driven for rotation, respectively. The electric heaters 7 are energized to heat the substrates on the holders 3 uniformly at a temperature from 200° to 500° C. Next, the electric heater 6 is energized to melt the beryllium source on the support table 8 in order to cause crystal growth of beryllium on each substrate. The process conditions should preferable adjusted so that the thickness of the beryllium layer on each substrate is in a range from 100 to 400 μm. After complete deposition of beryllium, each substrate is taken out of the deposition chamber 4 and placed in a nitric acid bath for chemical removal of the substrate and the molybdenum deposition layer.

Figure 3A:
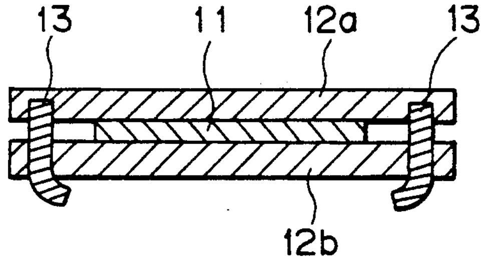
FIGS. 3A and 3B are sectional and side views of one embodiment of the hot roll unit usable for the process of the present invention.
Figure 3B:
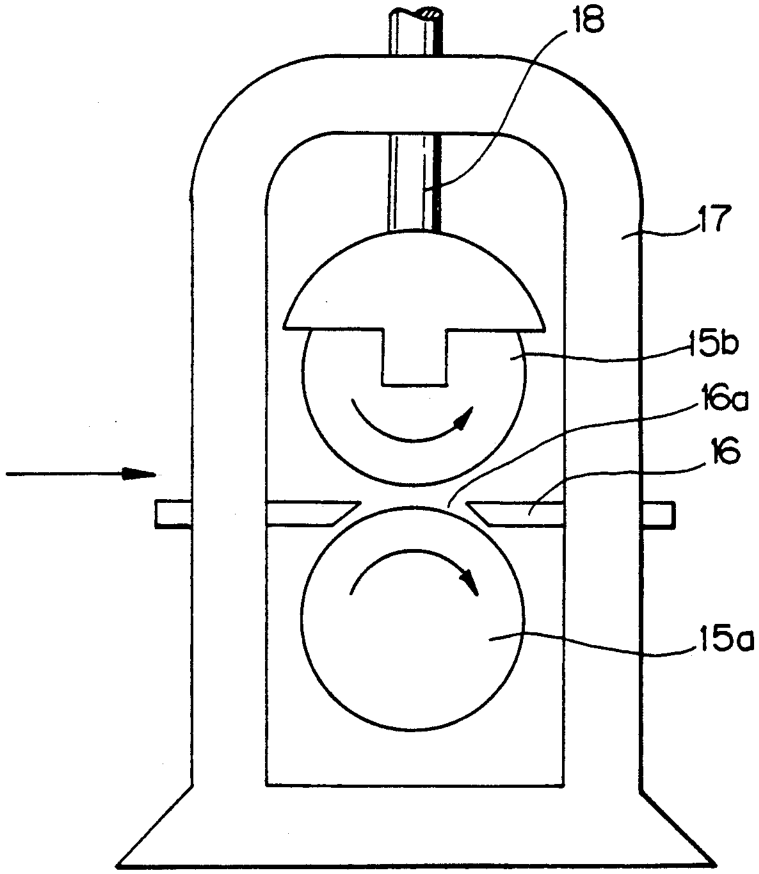

Next cross rolling is applied to the beryllium plate so prepared as shown in FIGS. 3A and 3B. This cross rolling is a rolling method to roll a plate several times in different rolling directions. In the first place, as shown in FIG. 3A, each beryllium plate 11 is sandwiched between a pair of stainless steel plates 12*a* and 12*b* and clamped firmly by means of fastener screws 13. In order to avoid unexpected fall, projecting ends of the fastener screws are bent.

One embodiment of the hot roll unit usable for the hot cross rolling process of the present invention is shown in FIG. 3B, in which a table 16 provided with a slit 16*a* is horizontally mounted to a framework 17. A pair of rollers 15*a* and 15*b* are arranged on both vertical sides of the slit 16*a* with their axes in parallel to each other so that they can be brought into surface pressure contact in the region of the slit 16*a* in the table 16. The upper roller 15*b* is supported, for vertical movement, by a press rod 18 which is mechanically connected to a proper known drive source not shown.

The beryllium plate 11 clamped between the two stainless steel plates 12*a* and 12*b* is supplied to the space between the two rollers 15*a* and 15*b* in the region of the slit 16*a* in the support table 16. Hot cross rolling is carried out preferably at a temperature in a range from 200° to 600° C. and under a pressure in a range from 50 to 400 MPa. For example, the process is carried out optimumly at a temperature of 500° C. and at a pressure of 200 MPa. By this hot cross rolling process, the thickness of the beryllium plate is decreased down to a range between 20 to 150 μm.

Figure 4:
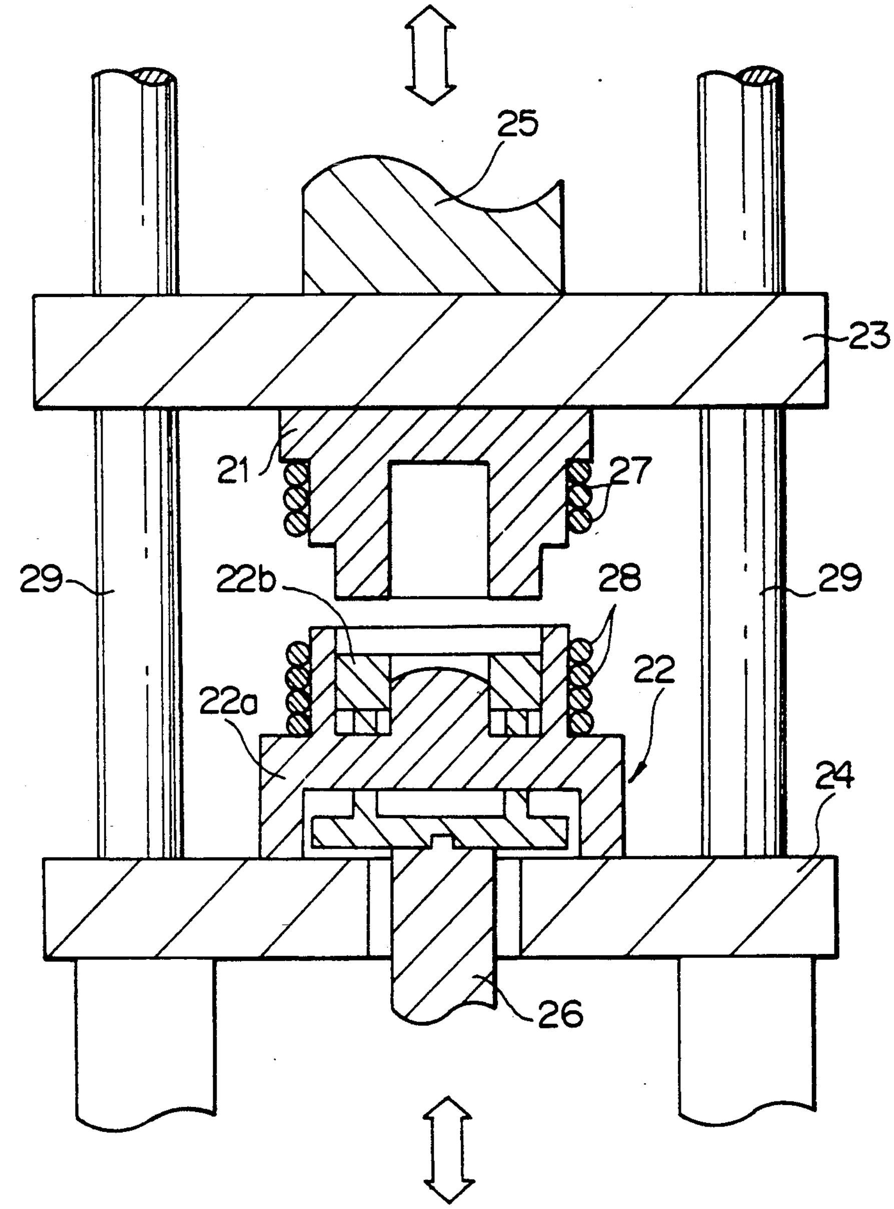
FIG. 4 is a side view, partly in section, of one embodiment of the hot press unit usable for the process of the present invention.

Finally, the beryllium plate is subjected to hot pressing. One embodiment of the hot press unit usable for the present invention is shown in FIG. 4, in which an upper table 23 is supported by an upper press rod 25 in an arrangement movable along upright guide posts 29. The guide posts 29 are mounted atop a lower table 24 mounted in parallel to the upper table 23 on a framework of the unit. As later described in more detail a lower press rod 26 extends upwards through the lower table 24. The press rods 25 and 26 are mechanically connected to proper known drive sources.

The upper table 23 carries on its lower face an upper die 21 which is embraced by an electric heater 27.

The lower table 24 carries on its top face a lower die 22 which is made up of a lower stationary block 22*a* and an upper mobile block 22*b* movably received within the stationary block 22*a*. The stationary block 22*a* is secured to the lower table 24 whereas the mobile block 22*b* is secured atop the lower press rod 26. The section of the stationary block 22*a* accommodating the mobile block 22*b* is embraced by an electric heater 28. The electric heaters 27 and 28 are connected to a given power source, respectively.

In hot pressing, a cross rolled x plate is placed on the lower die of the unit shown in FIG. 4 and electric heaters are energized to heat the upper and lower dies 21, 22 to a prescribed temperature. Then, the upper die 21 is moved downwards by the upper press rod in order to clamp the beryllium plate between the upper and lower dies 21, 22. Next, the mobile block 22*b* of the lower die 22 is forced to move upwards by the lower press rod 26 in order to shape the beryllium plate into a diaphragm of a desired configuration.

The above-described hot pressing is carried out preferably at a temperature in a range from 300° to 700° C. and at a lowering speed of the upper die 21 in a range from 1 to 100 m/min.

In accordance with the present invention, preparation of the crude beryllium plate via vacuum deposition well suppresses undesirable formation of impurities such as BeO, thereby providing a diaphragm of high beryllium purity. Subsequent hot cross rolling well crushes crystal grains in the beryllium plate while filling spaces of the grainboundary existing between the beryllium crystal grains in the original crystal structure before rolled. As a consequence, the diaphragm is provided with a very dense internal structure which assures high sound pressure of sounds generated by the diaphragm. Combined with the high beryllium purity, application of the hot cross rolling raises mechanical characteristics of the product such as tensile strength and extension so as to provide the rolled beryllium plate with high ductility which is well suited for subsequent hot pressing. For example, compared with the conventional powder metallurgy process, the temperature at hot pressing can be lowered by 100° to 200° C. Thanks to the relatively low temperature employable in the hot pressing, variations in the die temperature and pressurizing speed cause only small production of defective products, thereby assuring high production yield.

In addition, the process of the present invention in not so cumbersome as the conventional powder metallurgy process. Fine crystal structure resulted from the hot cross rolling greatly increases elastic modulus and flexibility of the product.

A beryllium diaphragm produced in accordance with the process of the present invention was subjected to quality tests together with a beryllium diaphragm prepared by the conventional vacuum deposition process. As a result it was confirmed that the product of the present invention was about 500 m/sec higher in sound speed and 50 GPa higher in elastic modulus.

Figure 5:
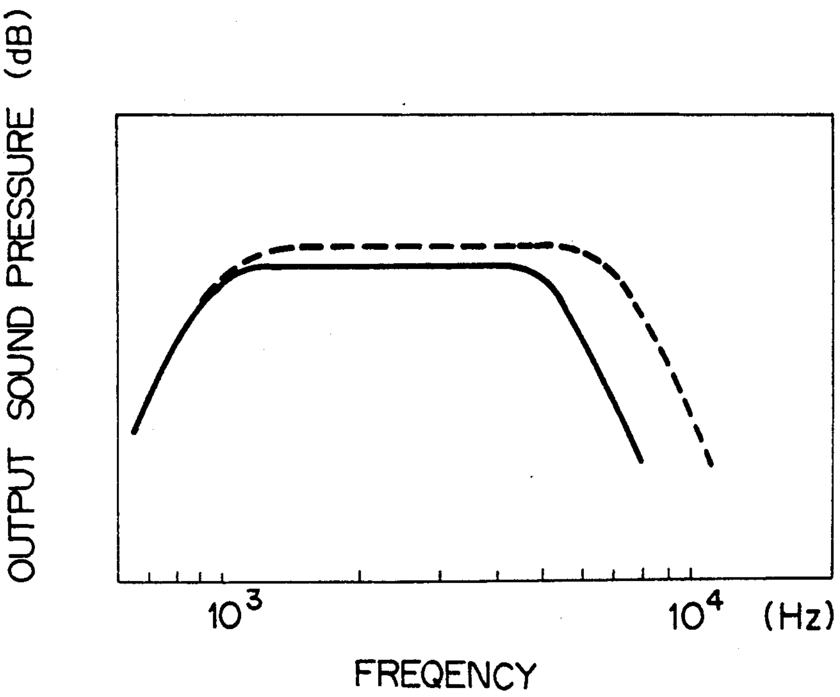
FIG. 5 is a graph showing the contrast in acoustic characteristics between the diaphragm produced in accordance with the present invention and the conventional diaphragm.

FIG. 5 represents comparison of the both products in output sound pressure in which frequency in Hz is taken on the abscissa and output sound pressure in dB is taken on the ordinate. A solid line is for the product of the conventional process and a dot line is for the product of the present invention. It is clearly seen in the graph that the frequency band of the product of the present invention well spans the treble range too.

We claim:

1. Process for producing a diaphragm for acoustic appliances comprising the steps of forming a beryllium layer on a substrate by means of vacuum deposition, separating said beryllium layer from said substrate to obtain a crude beryllium plate, subjecting said beryllium plate to hot cross rolling to obtain a rolled beryllium plate, and subjecting said rolled beryllium plate to hot pressing.

2. Process as claimed in claim 1 in which said vacuum deposition is carried out at a temperature in a range from 200° to 500° C.

3. Process as claimed in claim 1 in which said vacuum deposition is carried out so that the thickness of said beryllium layer is in a range from 100 to 400 μm.

4. Process as claimed in claim 1 in which said hot cross rolling is carried out at a temperature in a range from 200° to 600° C.

5. Process as claimed in claim 4 in which said hot cross rolling is carried out at a pressure in a range from 50 to 400 MPa.

6. Process as claimed in claim 4 in which said hot cross rolling is carried out so that the thickness of said rolled beryllium plate is in a range from 20 to 150 μm.

7. Process as claimed in claim 1 in which said hot pressing is carried out at a temperature in a range from 300° to 700° C.

8. Process as claimed in claim 7 in which said hot pressing is carried out at a pressuring speed in a range from 1 to 10 m/min.

9. Process as claimed in claim 2 in which said vacuum deposition is carried out so that the thickness of aid beryllium layer is in a range from 100 to 400 μm.

10. Process as claimed in claim 2 in which said cross rolling is carried out at a temperature in a range from 200° to 600° C.

11. Process as claimed in claim 2 in which said hot pressing is carried out at a temperature in a range from 300° to 700° C.

* * * * *